(12) United States Patent
Schott

(10) Patent No.: US 7,937,551 B2
(45) Date of Patent: May 3, 2011

(54) STORAGE SYSTEMS HAVING DIFFERENTIATED STORAGE POOLS

(75) Inventor: Eric R. Schott, Epsom, NH (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/761,884

(22) Filed: Jan. 20, 2004

(65) Prior Publication Data
US 2004/0153606 A1 Aug. 5, 2004

Related U.S. Application Data

(60) Provisional application No. 60/441,810, filed on Jan. 21, 2003.

(51) Int. Cl.
*G06F 12/02* (2006.01)
(52) U.S. Cl. ...................................... 711/173
(58) Field of Classification Search ............ None
See application file for complete search history.

(56) References Cited

U.S. PATENT DOCUMENTS

| | | | |
|---|---|---|---|
| 5,392,244 A * | 2/1995 | Jacobson et al. ............ 711/114 |
| 5,774,660 A | 6/1998 | Brendel et al. |
| 5,774,668 A | 6/1998 | Choquier et al. |
| 5,978,844 A | 11/1999 | Tsuchiya et al. |
| 6,070,191 A | 5/2000 | Narendran et al. |
| 6,108,727 A | 8/2000 | Boals et al. |
| 6,122,681 A | 9/2000 | Aditya et al. |
| 6,128,279 A | 10/2000 | O'Neil et al. |
| 6,141,688 A | 10/2000 | Bi et al. |
| 6,144,848 A | 11/2000 | Walsh et al. |
| 6,148,414 A | 11/2000 | Brown et al. |
| 6,189,079 B1 | 2/2001 | Micka et al. |
| 6,195,682 B1 | 2/2001 | Ho et al. |
| 6,199,112 B1 | 3/2001 | Wilson |
| 6,212,565 B1 | 4/2001 | Gupta |
| 6,212,606 B1 | 4/2001 | Dimitroff |
| 6,226,684 B1 | 5/2001 | Sung et al. |
| 6,292,181 B1 | 9/2001 | Banerjee et al. |
| 6,341,311 B1 | 1/2002 | Smith et al. |
| 6,360,262 B1 | 3/2002 | Guenthner et al. |

(Continued)

FOREIGN PATENT DOCUMENTS

WO     WO 99/53415 A     10/1999

(Continued)

OTHER PUBLICATIONS

The Zebra Striped Network File System, John H. Hartman et al, ACM 14th ACM Symposium on OPerating System Princicples, Dec. 8, 1993.*

(Continued)

*Primary Examiner* — Duc T Doan

(74) *Attorney, Agent, or Firm* — Hamilton, Brook, Smith & Reynolds, P.C.

(57) ABSTRACT

The systems and methods described herein include among other things, systems for providing a block level data storage service. More particularly, the systems and methods of the invention provide a block level data storage service that provides differentiated pools of storage on a single storage device. To this end, the systems and methods described herein leverage the different performance characteristics across the logical block name (LBN) space of the storage device (or devices). These different performance characteristics may be exploited to support two or more classes of storage on a single device.

17 Claims, 5 Drawing Sheets

U.S. PATENT DOCUMENTS

| | | | |
|---|---|---|---|
| 6,421,723 | B1 | 7/2002 | Tawil |
| 6,434,683 | B1 | 8/2002 | West et al. |
| 6,460,083 | B1 | 10/2002 | Niwa et al. |
| 6,473,791 | B1 | 10/2002 | Al-Ghosein et al. |
| 6,498,791 | B2 | 12/2002 | Pickett et al. |
| 6,598,134 | B2 * | 7/2003 | Ofek et al. ............ 711/162 |
| 6,687,731 | B1 | 2/2004 | Kavak |
| 6,718,436 | B2 * | 4/2004 | Kim et al. ............ 711/114 |
| 6,725,253 | B1 | 4/2004 | Okano et al. |
| 6,732,171 | B2 | 5/2004 | Hayden |
| 6,742,059 | B1 | 5/2004 | Todd et al. |
| 6,766,348 | B1 | 7/2004 | Combs et al. |
| 6,813,635 | B1 | 11/2004 | Jorgenson |
| 6,839,802 | B2 * | 1/2005 | Dimitri et al. ............ 711/112 |
| 6,850,982 | B1 | 2/2005 | Siegel |
| 6,859,834 | B1 | 2/2005 | Arora et al. |
| 6,886,035 | B2 | 4/2005 | Wolff |
| 6,910,150 | B2 | 6/2005 | Mashayekhi et al. |
| 6,944,777 | B1 | 9/2005 | Belani et al. |
| 6,950,848 | B1 | 9/2005 | Yousefi'zadeh |
| 6,957,433 | B2 * | 10/2005 | Umberger et al. ............ 718/103 |
| 6,985,956 | B2 | 1/2006 | Luke et al. |
| 7,043,564 | B1 | 5/2006 | Cook et al. |
| 7,076,655 | B2 | 7/2006 | Griffin et al. |
| 7,085,829 | B2 | 8/2006 | Wu et al. |
| 7,089,293 | B2 | 8/2006 | Grosner et al. |
| 7,127,577 | B2 | 10/2006 | Koning et al. |
| 2001/0039581 | A1 | 11/2001 | Deng et al. |
| 2002/0008693 | A1 | 1/2002 | Banerjee et al. |
| 2002/0009079 | A1 | 1/2002 | Jungck et al. |
| 2002/0035667 | A1 * | 3/2002 | Bruning et al. ............ 711/114 |
| 2002/0059451 | A1 | 5/2002 | Haviv et al. |
| 2002/0065799 | A1 | 5/2002 | West et al. |
| 2002/0138551 | A1 | 9/2002 | Erickson |
| 2002/0194324 | A1 | 12/2002 | Guha |
| 2003/0005119 | A1 | 1/2003 | Mercier et al. |
| 2003/0074596 | A1 | 4/2003 | Mashayekhi et al. |
| 2003/0117954 | A1 | 6/2003 | De Neve et al. |
| 2003/0225884 | A1 | 12/2003 | Hayden |
| 2004/0030755 | A1 | 2/2004 | Koning et al. |
| 2004/0049564 | A1 | 3/2004 | Ng et al. |
| 2004/0080558 | A1 | 4/2004 | Blumenau et al. |
| 2004/0083345 | A1 | 4/2004 | Kim et al. |
| 2004/0103104 | A1 | 5/2004 | Hara et al. |
| 2004/0128442 | A1 * | 7/2004 | Hinshaw et al. ............ 711/114 |
| 2004/0143637 | A1 | 7/2004 | Koning et al. |
| 2004/0143648 | A1 | 7/2004 | Koning et al. |
| 2004/0210724 | A1 | 10/2004 | Koning et al. |
| 2005/0010618 | A1 | 1/2005 | Hayden |
| 2005/0144199 | A2 | 6/2005 | Hayden |
| 2007/0106857 | A1 | 5/2007 | Koning et al. |

FOREIGN PATENT DOCUMENTS

| | | |
|---|---|---|
| WO | WO-01/38983 | 5/2001 |
| WO | WO-02/37943 | 5/2002 |
| WO | WO-02/44885 | 6/2002 |
| WO | WO-02/056182 | 7/2002 |

OTHER PUBLICATIONS

U.S. Appl. No. 60/411,743, filed Sep. 2002, Hinshaw et al.*

Multiple (Nested) RAID Levels, The PC Guide, 2001 pp. 1-2.*

Scheuermann P et al: "Data Partitioning and Load Balancing in Parallel Disk Systems" Techn. Rpt. A/02/96 University of Saarland. pp. 1-48.

Wei Lui et al: "Design of an I/O balancing file system on web server clusters" Parallel Processing 2000 Intern. Workshops on Aug. 21-24, 2000, Piscataway, NJ, USA, IEEE, Aug. 21, 2000, pp. 119-125.

Anderson T E et al: "Serverless Network File Systems" ACM Transactions on Computer Systems, Assoc. for Computing Machinery, New York, US, vol. 14, No. 1, pp. 41-79, Feb. 1, 1996.

Hac A et al: IEEE: "Dynamic load balancing in a distributed system using a decentralized algorithm" Int. Conf. on Distributed Computing Systems, West Berlin, Sep. 21, 1987. Conf. Proceedings vol. 7, pp. 170-177. Sep. 21, 1987.

Hartman J H et al: "The Zebra Striped Network File System" Operating Review (SIGOPS), ACM Headquarter New York, US vol. 27, No. 5, Dec. 1, 1993, pp. 29-43.

Baltazar, H. and Garcia, A. Build Your Own SAN (2002).

Druschel, P., Rice University and Rowstron, A., Microsoft Research, Cambridge, UK. PAST: A Large-Scale, Persistent Peer-to-peer Storage Utility.

Ottem, E, "Getting the Most From your Storage: How to Deploy a SAN," Gadzoox Networks, Inc. (1999).

Networking with Pyramix.

Storage Area Networking (SAN)—The Veritas Strategy. Q Associates (2000).

Rapaport, L. and Baltazar, H., Introduction to SANs: Technology, Benefits, and Applications, (Jul. 9, 2001).

"Enlist Desktops to Mirror Data," TechTarget (2002).

Office Action dated May 4, 2006 in U.S. Appl. No. 10/347,901, and subsequent reply.

Office Action dated Dec. 29, 2006 in U.S. Appl. No. 10/347,901, and subsequent reply.

Office Action dated Apr. 19, 2007 in U.S. Appl. No. 10/347,901, and subsequent reply.

Office Action dated Feb. 15, 2006 in U.S. Appl. No. 10/217,118, and subsequent reply.

Office Action dated Aug. 10, 2006 in U.S. Appl. No. 10/217,118, and subsequent reply.

Office Action dated Apr. 10, 2007 in U.S. Appl. No. 10/217,118, and subsequent reply.

Office Action dated Mar. 10, 2006 in U.S. Appl. No. 10/762,984, and subsequent reply.

Office Action dated Aug. 18, 2006 in U.S. Appl. No. 10/762,984, and subsequent reply.

Office Action dated Mar. 21, 2007 in U.S. Appl. No. 10/762,984, and subsequent pre-appeal brief.

Office Action dated May 31, 2006 in U.S. Appl. No. 10/347,898, and subsequent reply.

Office Action dated Oct. 6, 2006 in U.S. Appl. No. 10/347,898, and subsequent reply.

Druschel, P., et al., "PAST: A large-scale, persistent peer-to-peer storage utility," *HotOS VIII*, Schoss Elmau, Germany, May 2001.

Scheuermann, P., et al., "Data partitioning and load balancing in parallel disk systems," *The VLDB Journal—The International Journal on Very Large Data Bases*, 7(1): 1-48 (Feb. 1998).

"Networking with Pyramix," *Merging Technologies* (Feb. 2003).

Lee, Edward K., et al., "Petal: Distributed Virtual Disks," *The Proceedings of the 7th International Conference on Architectural Support for Programming Languages and Operating Systems*, pp. 1-9 (1996). (Month not available.).

* cited by examiner

STORAGE SYSTEMS HAVING DIFFERENTIATED STORAGE POOLS

RELATED APPLICATIONS

This application claims priority to earlier filed U.S. Provisional Application No. 60/441,810, naming Eric R. Schott as an inventor, and having a filing date of 21 Jan. 2003, the contents of which are incorporated by reference in their entirety.

BACKGROUND OF THE INVENTION

The systems and methods described herein relate to data storage.

More sophisticated storage technologies, such as RAID, provide differentiated classes of storage. These storage classes may differ in regard to performance, reliability, error detection and other factors. The different storage classes allow the system administrator to store different types of data with different classes of storage.

Although existing systems can work quite well, they generally employ separate storage devices for each class of service. Thus, one storage device can be set to a certain level of performance, such as RAID Level 0, and this device (or devices) can store the appropriate data, such as Photoshop temporary files. Thus, these systems require dedicated devices for the different classes of storage.

Accordingly, there is a need in the art for storage systems that provide differentiated classes of storage without requiring class-dedicated storage devices.

SUMMARY OF THE INVENTION

The systems and methods described herein include among other things, systems for providing a block level data storage service. More particularly, the systems and methods of the invention provide, among other things, a block level data storage service that provides differentiated pools of storage on a single storage device. To this end, the systems and methods described herein leverage the different performance characteristics across the logical block name (LBN) space of the storage device (or devices). These different performance characteristics may be exploited to support two or more classes of storage on a single device.

More particularly, the systems and methods described herein include, in one aspect, systems for providing differentiated classes of storage. Such systems may comprise a storage device having a plurality of storage locations and a logical block name space for organizing the storage locations. A performance process may partition the storage locations into a plurality of regions that provide different levels of performance, and a mapping process may map the partitioned portions of the storage locations to a selected section of the logical block name space.

In certain embodiments, the performance process separates the plurality of storage locations into a plurality of categories being associated with a different level of service, which for example may be associated with a different RAID level of performance. However, those of skill in the art will know that other types of differentiated storage, other than RAID, may be employed, including storage systems that distinguish between media employed, cost and other features or parameters. Moreover, in some embodiments the underlying storage device is a single storage medium, although optionally, the mapping process may create multiple storage volumes at a selected level of performance, and the multiple storage volumes may be associated with one or more storage devices.

Optionally, the system may further comprise a load balancing mover process for moving data between different portions of the logical block name space. The load balancing mover process may include an adaptive data placement process for moving data between storage pools to thereby improve system performance. Further, an admin process may allow an administrator to move data between different storage pools. These systems may move, store and access data blocks and to this end may move data blocks that are organized as files, including files having a directory structure and hierarchy to provide a file system service. In alternate embodiments, the systems may include a process for providing a storage volume service.

In another embodiment, the systems provide storage systems supporting differentiated classes of storage. Such systems can include a storage device having a plurality of storage locations, a logical block name space for organizing the storage locations, and performance parameters of the storage locations that vary across the storage device. The system may further include a partitioning process for partitioning those storage locations into regions as a function variations in performance parameters. The partitioning process may select a fixed set of partitions as a function of a selected configuration of system components. Further, a performance process may associate partitions with different levels of performance, and a mapping process may map the identified partitions of the storage locations to a selected section of the logical block name space.

The systems and methods described herein may be realized in many different forms, including as part of a RAID controller, device driver, operating system, application program, or network service. In one particular embodiment the system is realized as a storage area network, that includes one or more servers executing computer code that configures the server, at least in part, to carry out the processes that provide storage systems supporting differentiated classes of storage.

In another aspect, the invention provides a process for providing differentiated classes of storage. Such methods may comprise the steps of providing one or more storage devices having a plurality of storage locations and a logical block name space for organizing the storage locations. The process may partition the storage locations into a plurality of regions providing different levels of performance, and may map the partitioned portions of the storage locations to a selected section of the logical block name space. Optionally, the process may include the step of separating the plurality of storage locations into a plurality of categories associated with a different level of service, and optionally separating the plurality of storage locations into a plurality of categories being associated with a different RAID level of performance. In one practice the mapping process associates different portions of the logical block name space to different respective levels of RAID.

Optionally, the process may include the step of load balancing by moving data between different portions of the logical block name space. Load balancing may include moving data between storage pools, including storage pools that have different levels of performance, to thereby improve overall system performance, or the performance of certain aspects of the system, such as the overall performance of one class of storage, or to provide better service for one class of data.

To this end, the process may allow an administrator to move data between different storage pools. This can be done through a user interface that provides the administrator with the ability to set parameters, including operating parameters, which will move data between different storage pools.

The mapping step may create multiple storage volumes at a selected level of performance.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DESCRIPTION OF CERTAIN ILLUSTRATED EMBODIMENTS

The systems and methods described herein include systems for storing, organizing and managing resources. The systems and methods described below may employ a software architecture that builds certain of the processes described below into an operating system, into a device driver, or into a software process that operates on a peripheral device, such as a tape library, a RAID storage system or some other device. In any case, it will be understood by those of ordinary skill in the art that the systems and methods described herein may be realized through many different embodiments, and practices, and that the particular embodiment and practice employed will vary as a function of the application of interest and all these embodiments and practices fall within the scope hereof. Moreover, it will be understood by those of ordinary skill in the art that the systems and methods described herein are merely exemplary of the kinds of systems and methods that may be achieved through the invention and that these exemplary embodiments may be modified, supplemented and amended as appropriate for the application at hand.

Figure 1:
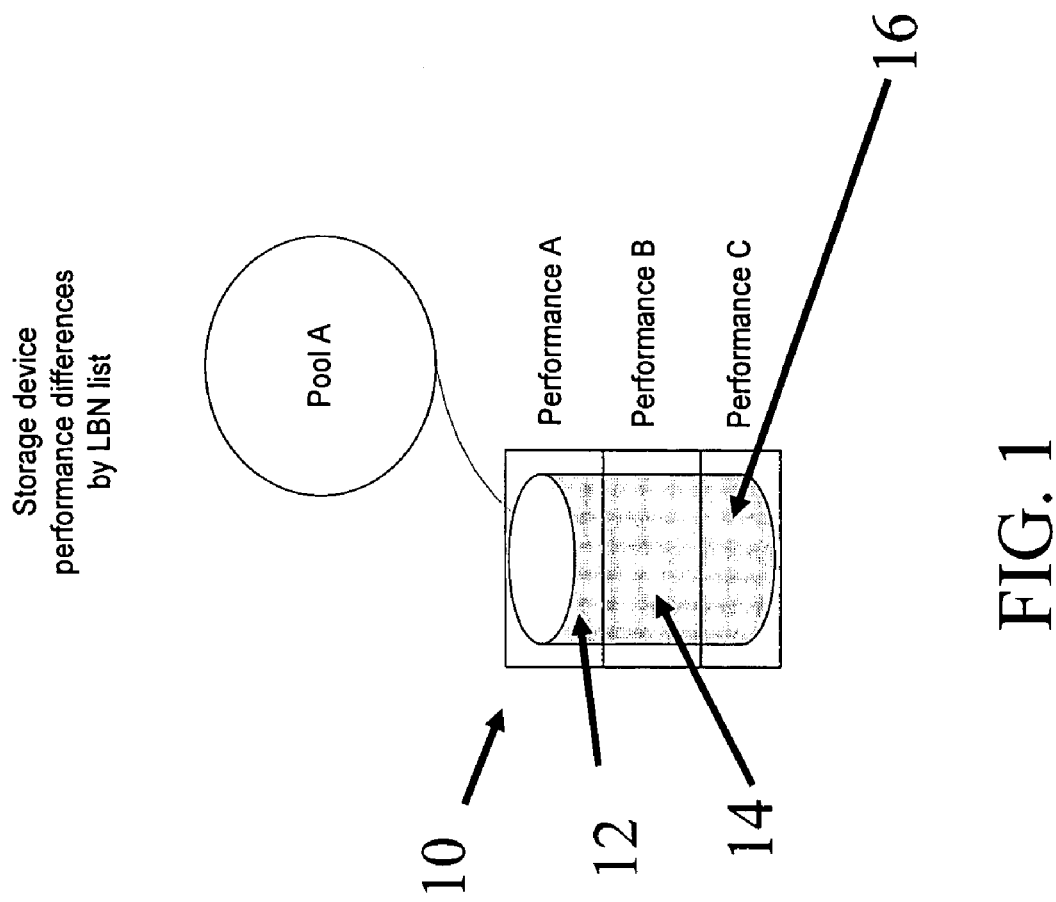
FIG. 1 depicts an individual storage device that has different performance characteristics based on a list of LBNs.

FIG. 1 depicts a storage device 10 and graphically portrays that different sections of the logical block name (LBN) can have different kinds of performance characteristics. Specifically, in the example depicted by FIG. 1, the LBN of the device 10 is divided into three different performance classes, which are shown respectively as Section 12, 14 and 16. Thus, FIG. 1 is an abstract representation of the entire name space on the disc 10. Although the use of these terms can vary somewhat, it is generally understood that the logical block name space is the full compliment of the adressable locations on the disc and it will be understood that a logical block will be understood as the smallest addressable space on a disc, such as the disc 10. Each logical block may be identified by a unique logical block name (or number), typically assigned in order starting from 0 at the beginning of the disc. Under the ISO 9660 standard, all data on a CD is addressed in terms of logical block numbers. Thus, the device depicted in FIG. 1 is generally understood to be a storage disc, such as a hard disk drive. However, the invention is not so limited. The systems and methods described herein may also be applied to compact discs, floppy disks, tape drive systems, and other similar kinds of data storage devices.

In any case, it can generally be understood that the logical block name space can be subdivided into different sections where each of these sections has different kinds of performance characteristics. The performance characteristics of interest might include the rate in which data can be accessed from that portion of the disc, the reliability of that portion of the disc, and how long it can take to access that portion of the memory device (which can be particularly relevant to digital linear tape storage).

In one practice, the systems and methods described herein include a performance measurement system that is capable of scanning an individual device, such as the depicted storage device 10, and measuring certain characteristics to determine how the device should be subdivided into different performance classes. In one embodiment, the performance measurement system makes experimental read and write operations across portions of the LBN and uses the collected experimental data to determine the performance characteristics of different logical block areas within the LBN space. The measuring process may then determine from these measured characteristics whether or not a collection of logical blocks can be aggregated into a section, such as one of the depicted sections 12, 14, or 16 wherein the aggregate logical blocks have common performance characteristics of interest and thereby provide a subspace within the LBN space that may be associated with a particular level of performance. Obviously, those of skill in the art can select the granularity over which the LBN space is subdivided into different sections and the granularity selected will depend largely on the application at hand and the number of storage classes desired or needed for the application of interest. In other practices and embodiments, partitioning into performance regions will be determined and done at system design time, and fixed for a particular system design. That design process may involve experiment and measurement, but the product that results from the design process typically will not itself incorporate a performance measurement component. The embodiment and practice selected can turn on the application being addressed and the specifics of the product design.

Doing measurement at "run time" may be useful if there will be widely varying configurations of the product, not all of which have been seen or analyzed in advance during the product design phase. Conversely, if product configurations are rigorously controlled and analyzed prior to approval, then the performance analysis may be done at that time and no measurement component is needed in the operational or delivered product.

Figure 2:
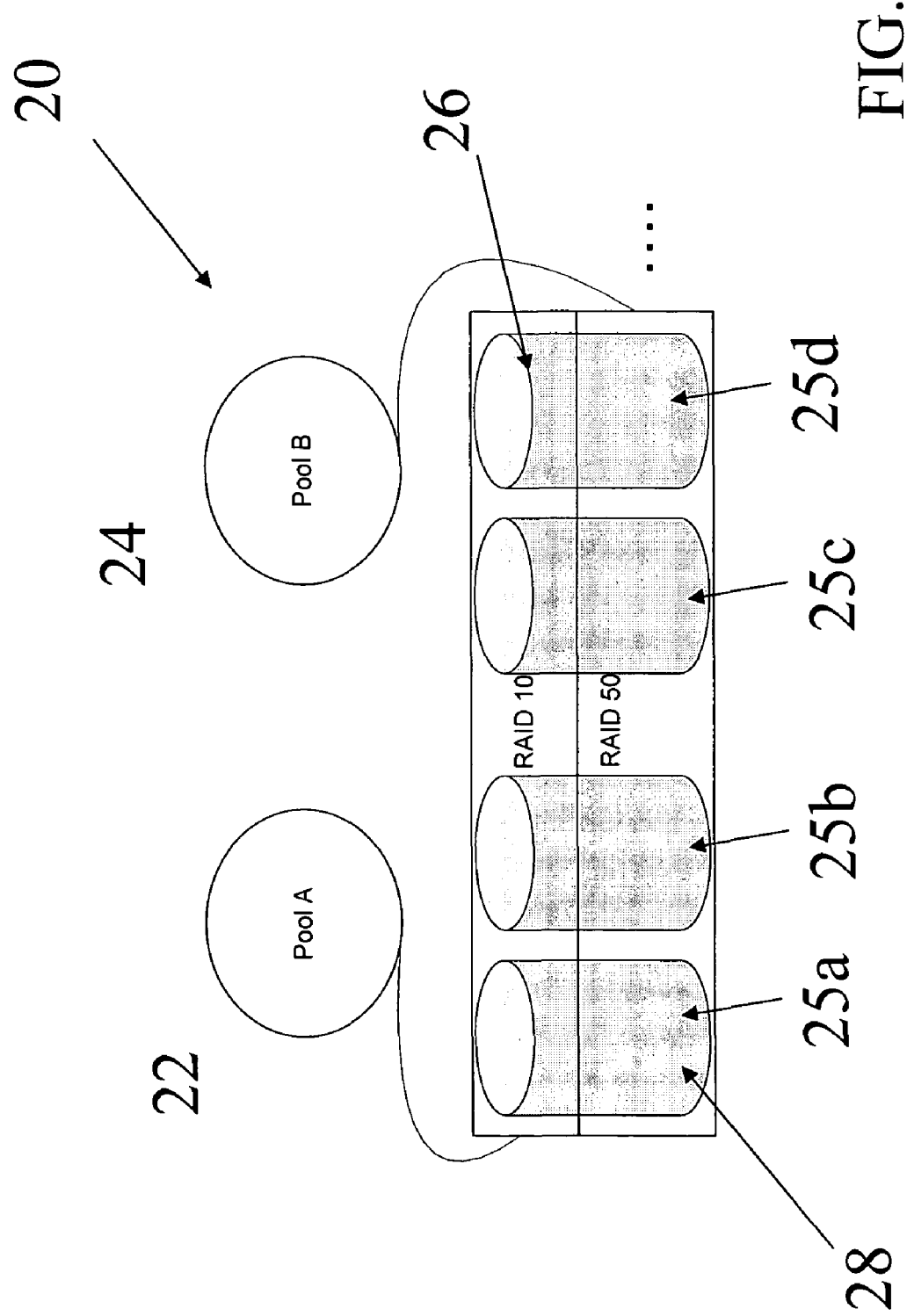
FIG. 2 illustrates RAID differentiated storage pools sharing the same storage devices.

Turning now to FIG. 2, one RAID system 20 is depicted wherein the RAID system 20 provides differentiated storage pools sharing the same storage devices depicted as devices 25A through 25D. Specifically, FIG. 2 depicts a RAID storage system 20 that includes a pool A 22 and a pool B 24. As shown in this embodiment, pool A 22 is set up as a RAID 10 storage pool and pool B 24 is set up as a RAID 50 storage pool. As known to those of skill in the art, RAID is a term commonly employed for the acronym redundant ray of inexpensive (or independent) disks. A RAID array is a collection of drives which collectively act as a single storage system, which can tolerate a failure of a drive without losing data and which can operate independently of each other. Although there are different types of RAID systems, in general, the UC Berkeley term "RAID" defined six RAID levels. Each level is a different way to spread data across the multiple drives in the system, such as the multiple systems 25A through 25D. This technique provides a compromise between cost and speed. The different levels have different meanings and each level is typically optimized for a different use or application. For example, RAID level 0 is not redundant and splits data across the different drives 25A through 25D resulting in higher data through-put. Since no redundant information is stored, the performance is very good, but the failure of any disk in the array results in data loss. This level is commonly referred to as striping. RAID level 1 is commonly referred to as mirroring with two hard drives. This level provides redundancy by duplicating all the data from one drive onto another drive. The performance of level 1 array is slightly better than a single drive, but if either drive fails, no data is lost. RAID level 10, such as the depicted pool A 22 employs, is a dual level array that employs multiple RAID 1 (mirrored) sets into a single array. Data is striped across all mirrored sets. RAID 1 utilizes several drives, provides better performance, and each drive is typically duplicated or mirrored. RAID 50, as employed by pool B 24, is a dual level array that employs multiple RAID 5 levels into a single array. This will be understood that the RAID system 20 depicted in FIG. 2 employs the four storage devices 25A through 25D to support two different classes of storage, each of which has different performance characteristics and different performance levels.

Figure 3:
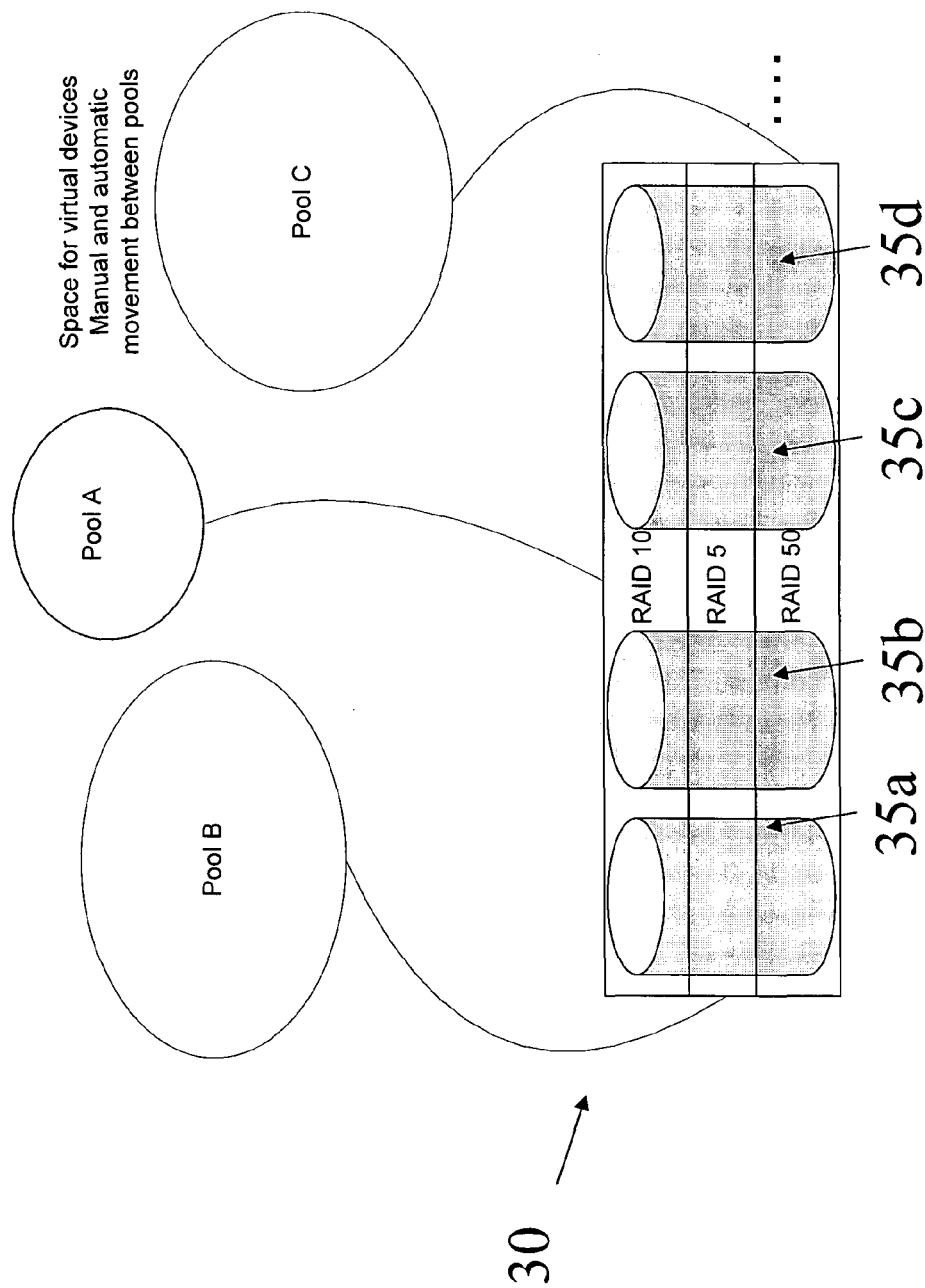
FIG. 3 depicts differentiated storage pools by combining individual storage device performance and RAID performance characteristics.

In one example system according to the invention, such as that depicted in FIG. 3, differentiated pools are created by combining the RAID levels depicted in FIG. 2 with the device performance variations depicted in FIG. 1. Specifically, FIG. 3 depicts a system 30 that comprises four storage devices 35A through 35D. Other storage devices may be added as needed. Similar to FIG. 1, the LBN space of the devices 35A through 35D is depicted abstractly as extending over the surface of the device and, as shown in FIG. 1, the devices 35A through 35D are subdivided into three subspaces, each LBN subspace being associated with a different performance level. Simultaneously, the system depicted in FIG. 3 associates different RAID levels with different performance subspaces. For example, the performance A LBN subspace is used to support a RAID 10 storage level, the performance B LBN subspace is employed to support a RAID 5 service level, and the performance C LBN subspace is employed to provide a RAID 50 performance level.

In the process of setting up the system 30, the storage system administrator can determine which of the performance LBN subspaces should be used to support a particular one of the RAID levels. Any suitable technique may be employed for choosing among the different subspaces. For example, if Region A is the region of the drives that has particularly good random access I/O performance, it will often be appropriate to allocate it to a RAID-10 set since RAID-10 is also characterized by good random access performance, especially random write performance; the characteristics of the two layers thus reinforce each other resulting in a "Pool A" that has excellent random write performance.

Figure 4:
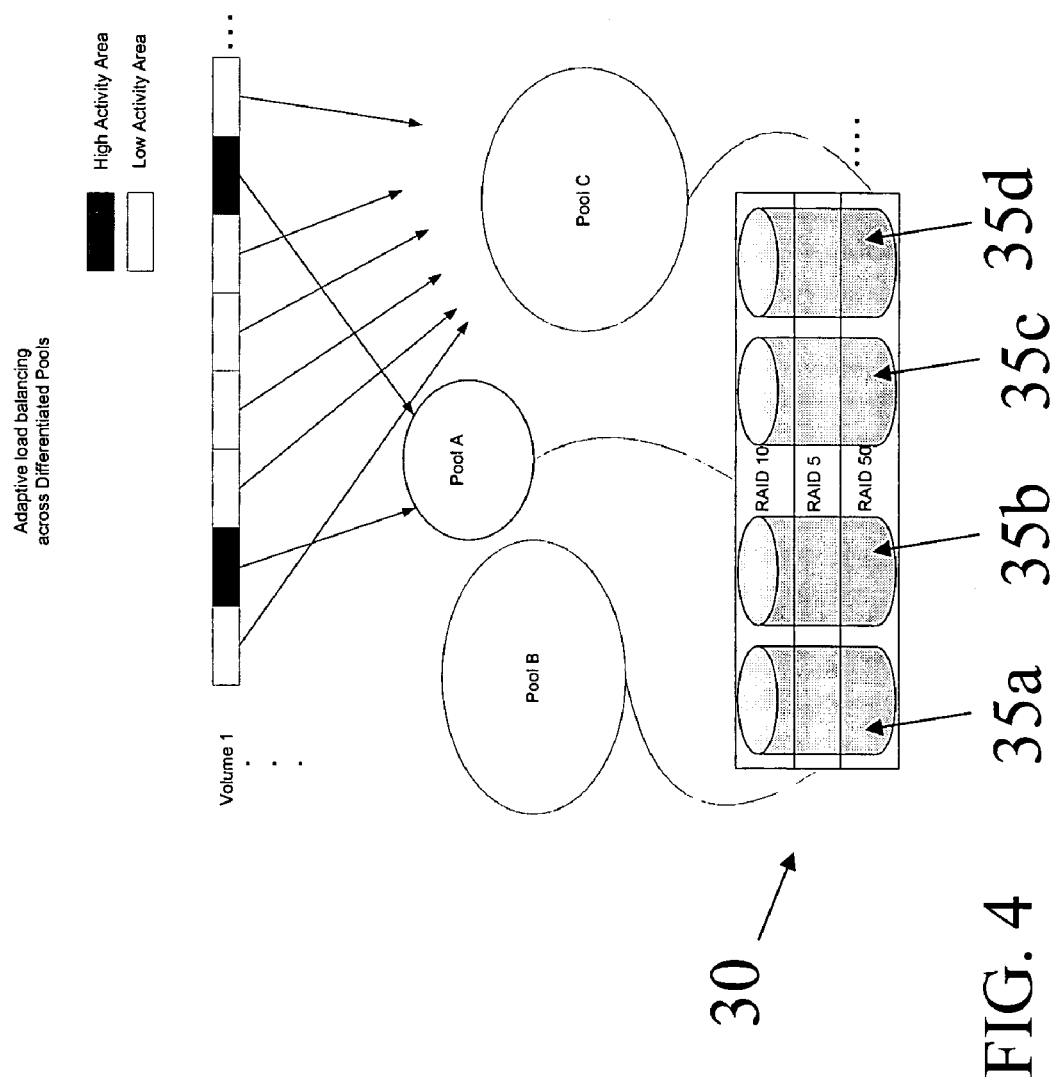
FIG. 4 illustrates extent based and page based allocation of a storage service across differentiated storage pools.
Figure 5:
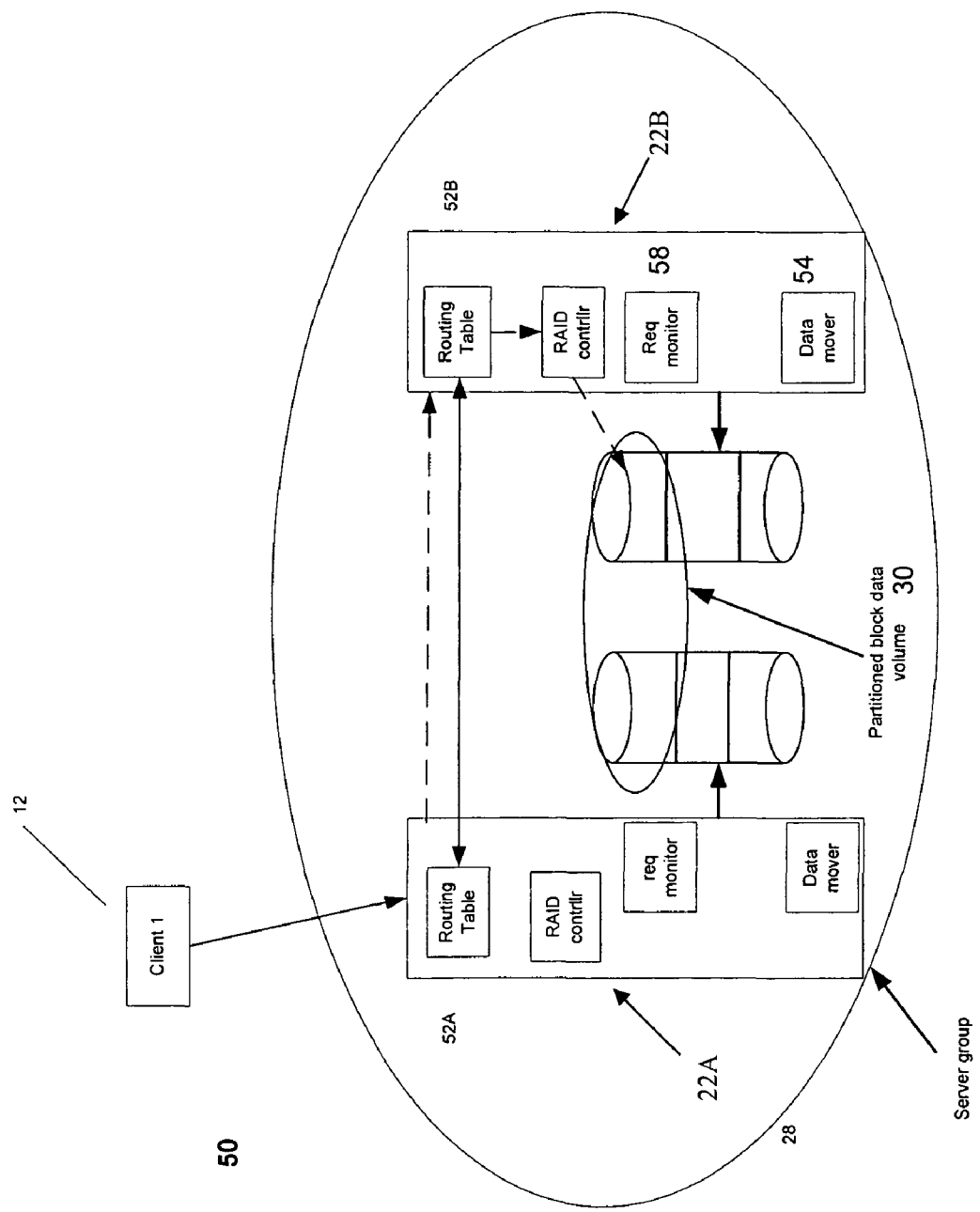
FIG. 5 depicts in more detail and as a functional block diagram one embodiment of a system according to the invention.

FIG. 4, depicts one example of an extent based or page based allocation operation of a storage service across the differentiated storage pools of the type depicted in FIG. 3. As depicted, the system 30 provides a Pool A that can store data that is frequently accessed. To this end, the Pool A subspace of the LBN is employed to support a RAID Level 10, which provides a certain amount of fault tolerance and provides respectable data throughput. By virtualizing the storage service across different classes of storage, while utilizing the same set of devices, as illustrated here, both optimal or substantially optimal performance and least physical device consumption may be obtained simultaneously. Multiple instances of the block storage service ("logical volumes") may be created, all sharing the same set of underlying differentiated storage pools. Each is allocated portions of the pools according to its performance requirements. FIG. 5 depicts an optional embodiment wherein the system employs an adaptive storage block data distribution process for distributing blocks of data across the different partitions of the data volume. One such suitable adaptive storage system is described in US Patent Application entitled ADAPTIVE STORAGE BLOCK DATA DISTRIBUTION U.S. Ser. No. 10/347,898 and naming G. Paul Koning et al. as inventor, the contents of which are herein incorporated by reference.

As described therein, each server 22 A, 22 B in the system 50 includes a routing table 52, a data mover process 54 and a request monitor process 58. The request monitor process 58 is capable of monitoring requests made to one of the servers 22 A or 22 B from the one or more clients 12 that are accessing the system 50.

The request may be associated with data blocks stored on a partition or somewhere on the volume of the storage device 30. The request monitor 58 can monitor the different requests that clients 12 make to the associated server or servers 22. Additionally, the request monitor 58 may communicate with other request monitor processes 58 running on the different equivalent servers 22 on the system 50. In this way, the request monitor 58 can generate a global view of the requests being forwarded by clients 12 to the partitioned block data storage system 50. By sharing this information, each server 22 may, through its associated request monitor process 58, develop a global understanding of the requests being serviced by the block data storage system 50.

As further shown in FIG. 5, the data mover process 54 employs the information stored within the routing table 52 for the purpose of determining whether a more efficient or reliable arrangement of data blocks may be achieved. To this end, the data mover process 54 comprises a computer program that applies an algorithm to the data collected by the request monitors 58. The data mover process 54 applies an algorithm that reviews the current distribution of data blocks and considers the current client 12 demand for these data blocks when determining whether a more efficient allocation of data blocks is available. In the embodiment depicted, this algorithm can determine whether a particular data block is more suited for a storage class that is different from the class presently used. Thus the adaptive process can move data blocks between and among the different storage classes available on the system, such as on the system 30. In this way, the system 50 can achieve the optimal or substantially optimal storage performance for the data. The storage performance achieved may be realized with systems that employ a single server, wherein the data mover process moves the data between different regions in the system. Thus, the systems and methods described herein may be employed with Storage Area Networks, including Storage Area Networks described in the above-referenced US Patent Application entitled Adaptive Storage Block Data Distribution.

Although FIGS. 1-5 depict exemplary systems as assemblies of functional block elements, it will be apparent to one of ordinary skill in the art that the systems and methods of the invention may be realized as computer programs or portions of computer programs that are capable of running on the servers to thereby configure the servers as systems according to the invention. Moreover, as discussed above, in certain embodiments, the systems of the invention may be realized as software components operating on a conventional data processing system such as a Unix workstation. In such embodiments, the system can be implemented as a C language computer program, or a computer program written in any high level language including C++, Fortran, Java or Basic. General techniques for such high level programming are known, and set forth in, for example, Stephen G. Kochan, *Programming in C*, Hayden Publishing (1983).

While the invention has been disclosed in connection with the preferred embodiments shown and described in detail, various modifications and improvements thereon will become readily apparent to those skilled in the art. For example, although the systems and methods of the invention may be employed with RAID differentiated storage, other differentiated storage systems and methods may also be used without departing from the scope hereof. Accordingly, the spirit and scope of the present invention is to be limited only by the following claims.

What is claimed is:

1. A system for providing differentiated classes of storage, comprising:
    a storage device having a plurality of storage locations and a logical block name space for organizing logical block names of the storage locations,
    a performance process configured to determine a level of performance for the plurality of storage locations and partition the plurality of storage locations into a plurality of regions as determined by their different levels of performance,
    a performance measurement system configured to scan storage locations of the storage device and determine the different levels of performance for the storage locations, and specifically wherein the performance measurement system performs experimental read and write operations and determines the different levels of performance from experimental data collected in the read and write operations,
    a mapping process configured to map the partitioned regions of the storage locations and aggregate the logical block names of the storage locations of the storage device in the partitioned regions having an identical level of performance to a selected section of the logical block name space,
    a RAID controller, for assigning a first RAID level configuration to a first set of aggregated logical block names of the storage device, and assigning a second RAID level configuration to a second set of aggregated logical block names of the storage device, the first and second RAID level configurations being different from each other; and
    the system thereby providing differentiated classes of storage having two or more differentiated RAID level configurations of the same storage device to one or more clients accessing the system.

2. A system according to claim 1, wherein:
    the performance process separates the plurality of storage locations into a plurality of categories as determined by their different levels of performance.

3. A system according to claim 1, further comprising:
    a process configured to employ the storage system to provide a file system service.

4. A system according to claim 1, further comprising:
    a process configured to provide a storage volume service.

5. A system according to claim 4, wherein the mapping process creates multiple storage volumes at a selected level of performance on the storage device.

6. The system of claim 1, wherein a level of performance includes a data access time, or a reliability of a storage location, or a combination thereof.

7. The system of claim 1, wherein the storage device is a single storage disk.

8. The system of claim 1, wherein the mapping process performs mapping and aggregating when the storage system is designed.

9. The system of claim 1, wherein the mapping process performs mapping and aggregating during operation of the storage device.

10. A performance process for providing differentiated classes of storage based on determined levels of performance of a plurality of storage locations of a storage device, the process comprising the steps of:
    providing a storage device having a plurality of storage locations and a logical block name space for organizing logical block names of the storage locations,
    determining a level of performance of the plurality of storage locations,
    partitioning the plurality of storage locations into a plurality of regions as determined by their different levels of performance,
    wherein the different levels of performance are further determined by performing experimental read and write operations and determining the level of performance from experimental data collected in the experimental read and write operations,
    mapping partitioned regions of the storage locations,
    aggregating the logical block names of the storage locations in the partitioned regions having an identical level of performance to a selected section of the logical block name space,
    assigning a first RAID level configuration to a first set of aggregated logical block names,
    assigning a second RAID level configuration to a second set of aggregated logical block names, the first RAID level configuration and second RAID level configuration being different from one another, and
    the storage device thereby providing differentiated classes of RAID level storage to one or more clients.

11. A process according to claim 10, further including the step of separating the plurality of storage locations into a plurality of categories as determined by their different levels of performance.

12. A process according to claim 10, wherein mapping creates multiple storage volumes at a selected level of performance.

13. The process of claim 10, wherein a level of performance includes a data access time, or a reliability of a storage location, or a combination thereof.

14. The process of claim 10, wherein mapping and aggregating are performed when a storage system that implements the process is designed.

15. The process of claim 10, wherein mapping and aggregating are performed during operation of a storage system that implements the process.

16. A system for providing differentiated classes of storage, comprising
    a storage device having a plurality of storage locations, a logical block name space for organizing logical block names of the storage locations, and performance parameters of the storage locations that vary across the storage device;
    a partitioning process configured to partition the storage locations into regions and aggregate the logical block names of the storage locations in the partitioned regions having an identical level of performance to a selected section of the logical block name space, thereby providing two or more differentiated classes of storage on the storage device to one or more clients accessing the system;

a RAID controller, for assigning different RAID level techniques to respective ones of the two or more differentiated classes of storage; and a performance measurement system that scans storage locations of the storage device and determines the level of performance of the storage locations, wherein determining performance further comprises performing experimental read and write operations and determining the level of performance from experimental data collected in the experimental read and write operations.

17. A system according to claim 16, wherein the partitioning process selects a fixed set of partitions as a function of a selected configuration of system components.

\* \* \* \* \*